Dec. 13, 1966    MASAO HORINO    3,292,172
WATERTIGHT SIGNAL LAMP
Filed April 10, 1964    2 Sheets-Sheet 1
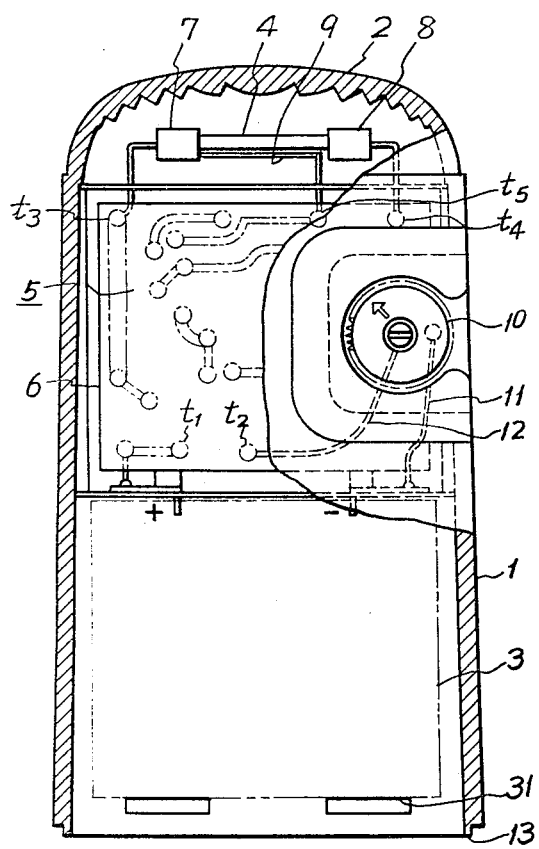
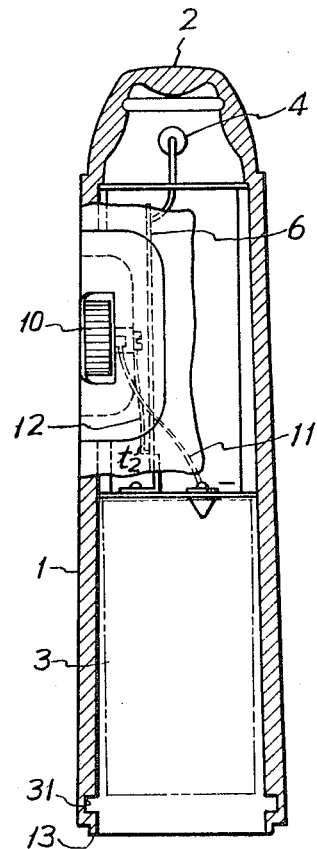
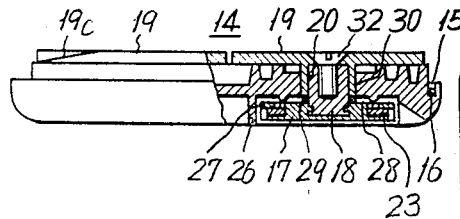
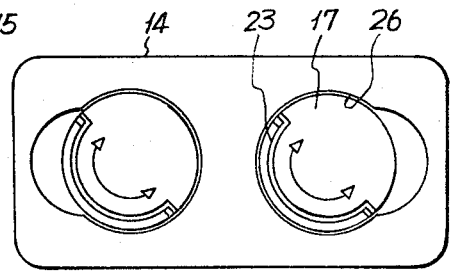
INVENTOR
Masao Horino
BY
ATTORNEY

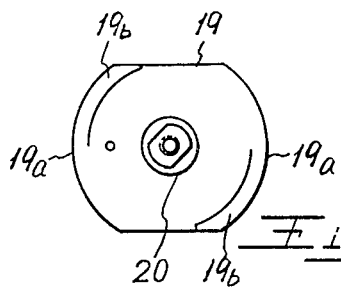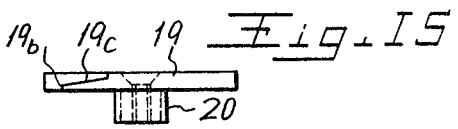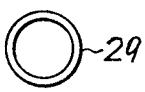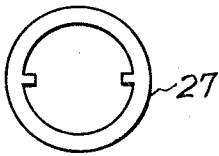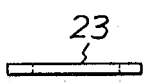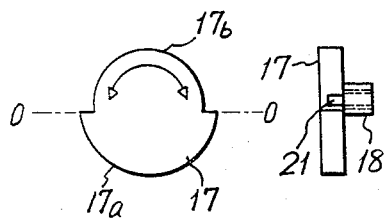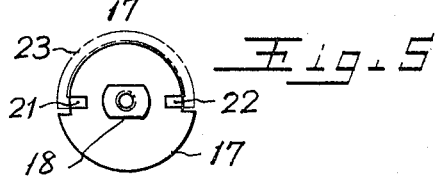

United States Patent Office 3,292,172
Patented Dec. 13, 1966

3,292,172
WATERTIGHT SIGNAL LAMP
Masao Horino, 81 Nakane-cho, Meguro-ku,
Tokyo, Japan
Filed Apr. 10, 1964, Ser. No. 358,858
Claims priority, application Japan, Apr. 13, 1963,
38/19,236
1 Claim. (Cl. 340—331)

This invention relates to a life lamp usable on the sea or the like which is automatically switched on to blink a discharge lamp enclosed therein when thrown into the sea in case of, for example, airplane accidents on the sea, and more particularly to a watertight case of such life lamp which is impermeable to water but capable of conducting electric circuits through water to blink the discharge lamp.

One object of this invention is to provide a watertight case enclosing a battery, a discharge lamp connected thereto and a control circuit for blinking the lamp at a predetermined time interval, in which a lid can be fastened to the case and freely detached therefrom, if necessary.

Another object of this invention is to provide a watertight case of a life lamp in which when a lid is put on the case or taken off therefrom a handle of the lid is turned about a shaft parallel to the plane of the lid and turned up in the direction at right angles to the plane of the lid and then turned about a shaft at right angles to the plane of the lid.

A further object of this invention is to provide a watertight case of a life lamp in which the marginal edge of the case and its lid abut each other through a rubber packing placed in a groove formed on the lid and a cam plate provided on the lid is turned into engagement with an associating groove formed on the inside of the case to suitably fasten the lid to the case, thereby sealing the case watertight at all times.

Other objects, features and advantages of the present invention will become apparent from the following description taken in conjunction with the accompanying drawings, in which;

FIGURE 1 is a partial cross-sectional front view of a rescue lamp according to the present invention;

FIGURE 2 is a similar partial cross-sectional side view of the rescue lamp;

FIGURE 3 is a cross-sectional view of a lid;

FIGURE 4 is its front view;

FIGURE 5 is a back view of a handle plate to be used for operating the lid to open and shut the case of the present invention;

FIGURE 6 is its side view;

FIGURE 7 is its front view;

FIGURE 8 is its cross-sectional view;

FIGURE 9 is a front view of a handle which is fitted with the handle plate and turns the plate;

FIGURE 10 is a side view of the handle;

FIGURE 11 is a front view of a spring mounted on the inside of the handle plate;

FIGURE 12 is its side view;

FIGURE 13 is a front view of a rubber packing for making watertight between the handle plate and a shaft passing therethrough;

FIGURE 14 is its side view;

FIGURE 15 is a side view of a cam plate secured to the shaft on the opposite side to the lid of the handle plate;

FIGURE 16 is its back view; and

FIGURE 17 is a front view of a screw for securing the cam plate to the shaft.

Referring now to the drawings, 1 is a case which is preferable to make of a plastic material such, for example as synthetic resin. A transparent lens portion 2, which is similarly made of a plastic material integrally with or separately from the case, is mounted on the front thereof. This case encloses a battery 3, a xenon discharge lamp 4 with xenon gas sealed therein and a control circuit 5 which is connected to the battery and blinks the discharge lamp at a predetermined time interval. The control circuit 5 has a suitable circuit formed on for example, a printed distributing board 6 and receives voltage from the battery 3, oscillating at certain intervals. To its high-voltage terminals $t_3$ and $t_4$, main electrodes 7 and 8 of the aforementioned xenon gas discharge tube are connected respectively and a control electrode 9 is connected to a terminal $t_5$ to which control voltage is supplied. The distributing board 6 is provided with D.C. input terminals $t_1$ and $t_2$ which are connected to the positive and negative electrodes of the battery, and the negative side is connected to the input terminal $t_2$ through a suitable switch 10 which may be operated from the outside and through leads 11 and 12 connected thereto.

On the opposite side of the case to the upper lens portion 2, there is an opening for inserting and removing the aforementioned parts. A marginal edge 13 at the open end of the case fits in an annular groove 15 formed on an outer periphery of a lid 14 as shown in FIGURE 3. A rubber packing 16 is inserted in the annular groove 15 to thereby hold them watertight.

Now, I will explain means for fastening the lid 14 to the case 1 watertight.

The lid 14 is provided with a pair of clamp portions, with which the lid is clamped detachably. That is, a handle plate 17 such as illustrated in FIGURES 5 to 8 is provided which is mounted on the outside of the lid. Fixed at the center of the handle plate is a rotary shaft 18, on the inside of which a female screw has been cut and the outside of which is so formed as to turn the handle plate itself and a cam plate together when the handle plate engages with a shaft sleeve 20 of the cam plate provided on the inside of the lid, as shown in FIGURES 15 and 16. The handle plate 17 is composed of a semicircular portion 17a of larger diameter and another semicircular portion 17b of smaller diameter. On the diameter O—O which forms the demarcation between the two portions, there are provided recesses 21 and 22 which confront each other. Into the recesses 21 and 22, shafts 24 and 25 of a semicircular handle 23 such as shown in FIGURES 9 and 10 is inserted. The radius of the handle 23 is equal to the semicircular portion 17a of larger diameter of the handle plate and the handle is placed along the circumference of the semicircular portion 17b of smaller diameter (refer to the dotted line in FIGURE 5). As is apparent from FIGURES 5 and 6, the recesses 21 and 22 are formed on the inside of the handle plate 17 and the shafts 24 and 25 of the handle 23 are inserted into the recesses 21 and 22 from the inside of the handle plate. With the lid 14 secured to the handle plate 17, the shafts 24 and 25 of the handle are held between the outside of the handle plate 17 and the surface of the lid 14 and the semicircular handle turns about the shafts 24 and 25 to be set up in the direction at right angles with respect to the surface of the handle plate 17, namely the surface of the lid 14. It is preferable to afford resiliency to the clamping by mounting a spring 27 such as shown in FIGURES 11 and 12 between the inside of the handle plate 17 and the surface of a concave groove 26 of the lid 14.

On the bottom of the handle plate 17 of the lid 14 and the concave groove 26 for the handle to be placed, there is formed an annular groove 28 along the periphery of the shaft sleeve 20 of the cam plate 19, in which a rubber packing 29 such as shown in FIGURES 13 and 14 is inserted to thereby form watertight the portion between the shaft sleeve and an aperture 30 of the lid 14.

The cam plate 19 is formed as illustrated in FIGURES 15 and 16, namely it has circular margins 19a on the right and left sides thereof, where screw threads 19b are formed. Consequently the cam plate 14 has inclinations 19c such that the screw portions become gradually thinner toward the end thereof. As result of this, the cam plate is turned into engagement with the associating groove 31 of the case 1.

The respective parts described above are assembled as follows. FIGURES 5, 8, 9, 11, 13, 15 and 17 illustrate the arrangement for providing the lid 14 with the respective parts shown in the figures. That is, at first the spring 27 such as shown in FIGURE 11 is put in the concave groove 26 formed on the outside of the lid 14. Then, the rubber packing 29 and the handle 23 are placed in the predetermined positions. Finally the rotary shaft 8 of the handle plate 17 is inserted into the aperture 30 to attach the plate to the lid 14. Then, the cam plate 19 is attached to the lid from the inside thereof and at this time the rotary shaft 18 is inserted into the shaft sleeve 20 and then the screw 32 shown in FIGURE 17 is screwed into the female screw of the rotary shaft 18 from above. Thus, the lid 14 is completely constructed as illustrated in FIGURE 3.

According to the present invention, the case 1 is sealed as follows. At first, the marginal edge 13 of the case 1 and the groove 15 of the lid 14 are put together and the handle 23 is turned up at right angles from the handle plate 17 by being rotated about the shafts 24 and 25. Then the handle is turned in one direction to rotate the handle plate 17, accordingly the rotary shaft 18 is rotated, and the cam plate 19 is also revolved correspondingly. Therefore, the screw portions 19b of the cam plate function as male screws and the associating grooves 31 of the case 1 serve as female screws to receive the screw portions, so that the inclinations 19c of the cam plate 19 gradually enter into the associating grooves 31 in response to the rotation of the handle 17, gradually fastening the lid and the case together in accordance with the degree of the screw pitch. The marginal edge 13 presses a rubber packing 16 inserted into the annular groove 15 to join them watertight. The shaft sleeve 20 and the lid 14 can be joined watertight with the rubber packing 29 shown in FIGURE 13.

In the present invention as described in the foregoing, when the case and the lid are attached to each other and the handle is turned up from the outside of the lid and turned in the one direction, the case and the lid can be fastened together watertight from outside due to the co-operation of the cam plate and the associating grooves as explained previously. When it is in use, the handle is turned down around its shafts to be enclosed in the concave groove of the lid, so that the handle does not project from the case and the case can be formed small and compact as a whole. The lid can easily be taken off only by turning up the handle and rotating it in the other direction. That is, cam plates get out of engagement with the associating groove and the lid can be removed from the case.

It will be apparent that many modifications and variations may be effected without departing from the scope of the novel concept of this invention.

What is claimed is:

A watertight signal lamp comprising a case enclosing a battery, a discharge lamp and a control circuit connected to the battery and blinking the discharge lamp at predetermined intervals, said case having an open end and associating grooves on the inner wall near a marginal edge at said open end, a lid attached to the marginal edge of said case to seal the case watertight, said lid having a concave portion formed on the outside thereof, a handle plate consisting of a half circular portion of larger diameter and a half circular portion of smaller diameter and having a rotary shaft at the center thereof, a cam plate forming screw portions engaging the associating grooves provided on said case on the inside of the lid and having at the center a shaft sleeve to be fitted with the rotary shaft of said handle plate, said shaft sleeve passing through an aperture of said lid and said cam plate being coupled through the lid by driving a screw inserted from the center hole of the cam plate into a female screw of said rotary shaft, a half circular handle having rotatable shafts fitted into recesses provided across the diameter at the demarcation of said half circular portions of larger and smaller diameters of said handle plate, said handle being of substantially the same diameter as the half circular portion of larger diameter, a rubber packing inserted into an annular groove of said lid proper to be attached to the marginal edge of the case, a rubber packing disposed around the shaft sleeve of said cam plate to form a watertight connection between the shaft sleeve and the aperture of the lid proper through which the shaft sleeve passes.

References Cited by the Examiner

UNITED STATES PATENTS

| | | | |
|---|---|---|---|
| 2,263,843 | 11/1941 | Gross | 292—241 |
| 2,355,013 | 8/1944 | Rochestie | 9—8.3 |
| 2,404,681 | 7/1946 | Baack | 9—8.3 |
| 2,779,616 | 1/1957 | Houghton | 292—241 |

NEIL C. READ, *Primary Examiner.*

I. J. LEVIN, *Assistant Examiner.*